(12) United States Patent
Kogler et al.

(10) Patent No.: US 8,206,787 B2
(45) Date of Patent: Jun. 26, 2012

(54) PROCESS FOR PRODUCING HONEYCOMB BODIES FOR THERMAL REGENERATORS

(75) Inventors: Georg Kogler, Deutschlandsberg (AT); Christoph Hagg, Graz (AT); Franz Kronabether, Deutschlandsberg (AT); Christian Mitteregger, Deutschlandsberg (AT)

(73) Assignee: Porzellanfabrik Frauenthal GmbH, Frauenthal (AT)

(*) Notice: Subject to any disclaimer, the term of this patent is extended or adjusted under 35 U.S.C. 154(b) by 0 days.

(21) Appl. No.: 12/330,321

(22) Filed: Dec. 8, 2008

(65) Prior Publication Data
US 2009/0142494 A1    Jun. 4, 2009

Related U.S. Application Data

(63) Continuation of application No. PCT/AT2007/000267, filed on Jun. 4, 2007.

(30) Foreign Application Priority Data

Jun. 6, 2006  (AT) .................................. A 967/2006

(51) Int. Cl.
*B05D 3/02*    (2006.01)
(52) U.S. Cl. ........................................................ 427/314
(58) Field of Classification Search .................. 427/314
See application file for complete search history.

(56) References Cited

U.S. PATENT DOCUMENTS

| 4,045,241 | A | * | 8/1977 | Daimon et al. | 106/461 |
| 4,614,673 | A | * | 9/1986 | Bendig | 427/376.2 |
| 2002/0198104 | A1 | * | 12/2002 | Nishimura et al. | 502/439 |
| 2005/0046063 | A1 | * | 3/2005 | Toda et al. | 264/44 |
| 2005/0106356 | A1 | * | 5/2005 | Ikeshima | 428/116 |
| 2005/0159308 | A1 | * | 7/2005 | Bliss et al. | 502/439 |

FOREIGN PATENT DOCUMENTS

| DE | 37 12 538 | 11/1988 |
| DE | 37 36 642 | 5/1989 |

OTHER PUBLICATIONS

Chemical Abstracts & Indexes, American Chemical Society, Jun. 28, 1986, XP000191844.
Chemical Abstracts & Indexes, American Chemical Society, May 3, 1976, XP000318869.

* cited by examiner

Primary Examiner — Timothy Meeks
Assistant Examiner — Nathan T Leong
(74) Attorney, Agent, or Firm — Cozen O'Connor

(57) ABSTRACT

A process for producing a honeycomb body from a noncatalytically active ceramic material for thermal regenerators, comprising the steps of (a) providing a block-shaped monolithic honeycomb body created by extrusion that includes in its interior longitudinal channels; (b) applying a thermal pretreatment to the honeycomb body; (c) after step (b), coating or masking the outer walls of the honeycomb body with a glaze-repellent coating, coating all the longitudinal channels of the honeycomb body with a glaze, and then drying the honeycomb body; and (d) after step (c), performing a firing operation at a temperature typical for the glazed material.

16 Claims, 4 Drawing Sheets

PROCESS FOR PRODUCING HONEYCOMB BODIES FOR THERMAL REGENERATORS

RELATED APPLICATIONS

This application is a continuation of International Application PCT/AT2007/000267 filed Jun. 4, 2007. This application claims the priority of Austrian patent application no. A 967/2006 filed Jun. 6, 2006, the content of which is hereby incorporated by reference.

FIELD OF THE INVENTION

The invention relates to a process for producing honeycomb bodies from a noncatalytically active ceramic material for thermal regenerators, in which block-shaped monolithic honeycomb bodies are created by extrusion that are provided in their interior with longitudinal channels and that are dried and fired after the extrusion.

BACKGROUND OF THE INVENTION

In the case of exhaust air cleaning, various ingredients, in the channels of the ceramic honeycomb bodies that are used as thermal regenerators, for instance in exhaust air cleaning systems—so-called RTO (regenerative thermal oxidizer) systems—lead to adhesions, vitrification, corrosion and abrasion on the channel walls and to clogging of the channels of these ceramic honeycomb bodies. Such effects can severely impair the operation and function of such exhaust air cleaning systems. Besides the major expenditure of time and the high costs for cleaning or replacing the honeycomb bodies, a severe impairment of the exhaust air source, namely, of the affected production, occurs as well.

The aforementioned unwanted effects of exhaust air ingredients (dust, ash, alkalis, acids, corrosive reaction products, products of decomposition, etc.) are observed primarily in the uppermost temperature zones of regenerator beds. Such effects as clogging can occur when there is already a high burden of dust on the inlet side or in the cold area of the regenerator. Depending on the temperature of decomposition of the exhaust air ingredients, however, deposits can occur in the middle areas of the system as well.

Among the most unpleasant exhaust gas ingredients are organosilicates or in general silicon compounds, which can cause recurrent clogging of ceramic honeycomb bodies in a stack of such elements. Such strongly adhering encrustations (see FIG. 1) can be removed only with great difficulty by cleaning, and the damage can often be eliminated only by replacing the affected layer. A further cause of damage is the reaction of corrosive ingredients with the ceramic material itself (see FIG. 2), which can lead to the loss of mechanical stability and hence the loss of function of the ceramic honeycomb bodies.

Typical materials of ceramic honeycomb bodies for use as heat reservoirs in regenerative applications are alumina porcelain, cordierite and mullite ceramic. These materials are distinguished by different properties, such as heat storage capacity, density, thermal shock resistance, porosity, chemical resistance, roughness, etc.

For lessening the aforementioned unwanted effects, certain combinations of these properties are advantageous, but they cannot be combined in one ceramic material, or if so only with difficulty. For example, high thermal shock resistance is hardly achievable in conjunction with high chemical resistance.

To lessen deposits on the channel walls or to make it easier to remove these deposits or to eliminate clogs in the channels, dense or smooth surfaces are advantageous. All the aforementioned materials have a more or less great tendency to deposits and can be only more or less poorly cleaned. The available materials therefore often permit a compromise for the intended use. For instance, good chemical resistance is associated with poor thermal resistance, while materials with good thermal resistance usually have greater roughness, and so forth.

SUMMARY OF THE INVENTION

An object of the invention is to overcome the disadvantages described and to suppress such unwanted effects as deposits on the channel walls and clogs in them as well as chemical attacks on the ceramic honeycomb material.

This and other objects are attained in accordance with one aspect of the invention directed to a process for producing honeycomb bodies from a noncatalytically active ceramic material for thermal regenerators, in which block-shaped monolithic honeycomb bodies are created by extrusion. The honeycomb bodies are provided in their interior with longitudinal channels and are dried and fired after the extrusion. All the longitudinal channels of the honeycomb bodies, after a thermal pretreatment and before the actual firing operation, are coated with a glaze, and the outer walls of the honeycomb body are masked or coated with a glaze-repellent coating. The firing operation, after prior drying, is performed at the temperature typical for the glazed material.

Such a process is effective for coating the longitudinal channels of the honeycomb bodies with a smooth, glassy surface that has a shiny appearance and that lessens the effect of deposits and clogs, which leads to a lengthening of the cleaning intervals of the honeycomb bodies. Because of the smooth surface, cleaning the channels is additionally facilitated.

DETAILED DESCRIPTION OF THE DRAWINGS

The process for producing a honeycomb body from a noncatalytically active ceramic material for thermal regenerators includes the step of providing a block-shaped monolithic honeycomb body 1 created by extrusion that includes, in its interior, longitudinal channels 2. A thermal pretreatment is applied to the honeycomb body. The outer walls of the honeycomb body are coated or masked with a glaze-repellent coating. Then, all the longitudinal channels of the honeycomb body are coated with a glaze, and the honeycomb body is dried. Then, a firing operation is performed at a temperature typical for the glazed material.

Figure 3:
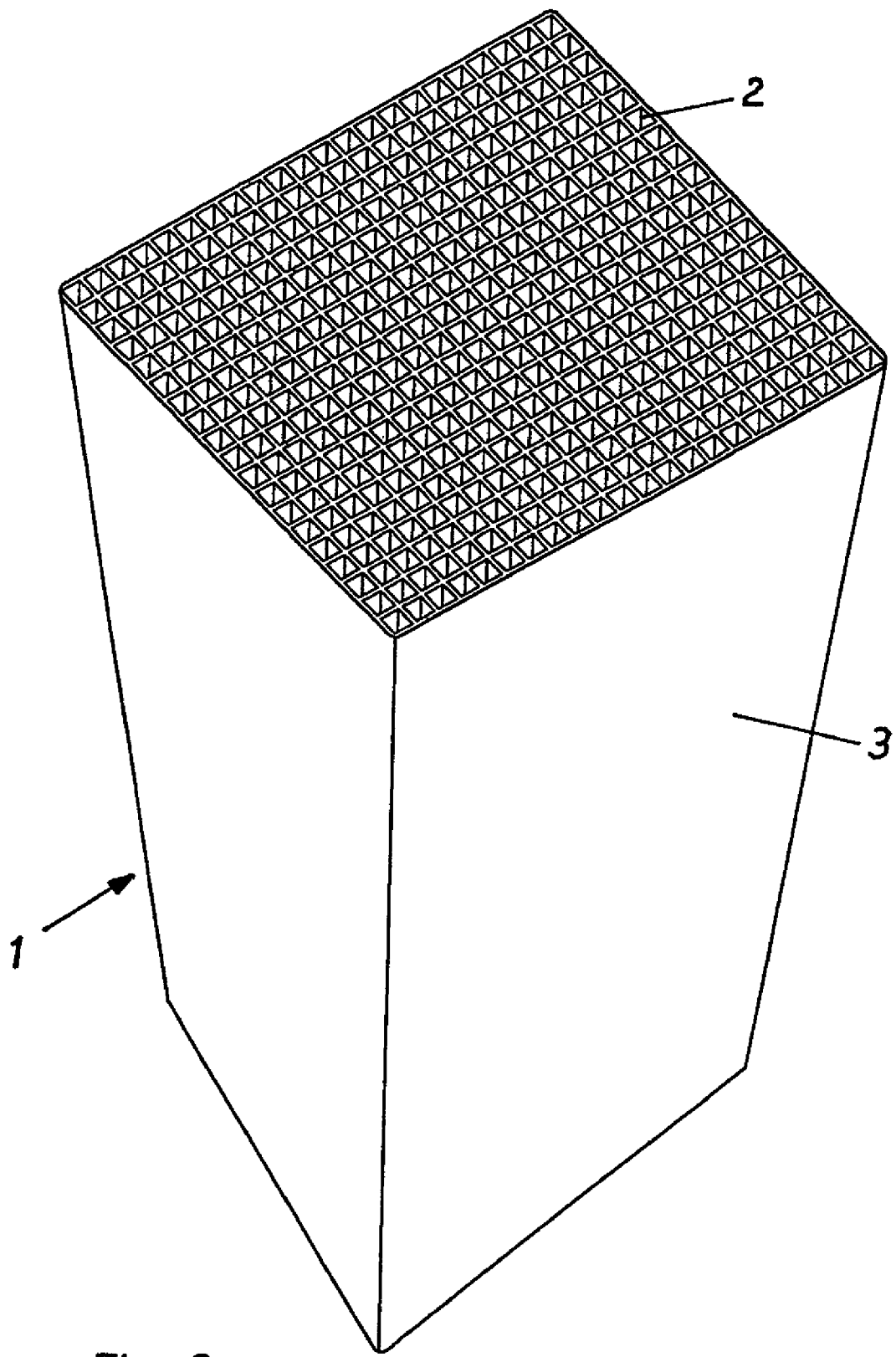
FIG. 3 shows a glazed honeycomb body 1 in accordance with an embodiment of the invention.

In the ceramic honeycomb body 1 according to the invention, shown in FIG. 3, the longitudinal channels 2 have been provided with a glaze. The outer walls 3 of the honeycomb body are not glazed, to prevent it from sticking during firing. The material of the honeycomb body can be alumina porcelain or cordierite ceramics.

Figure 4:
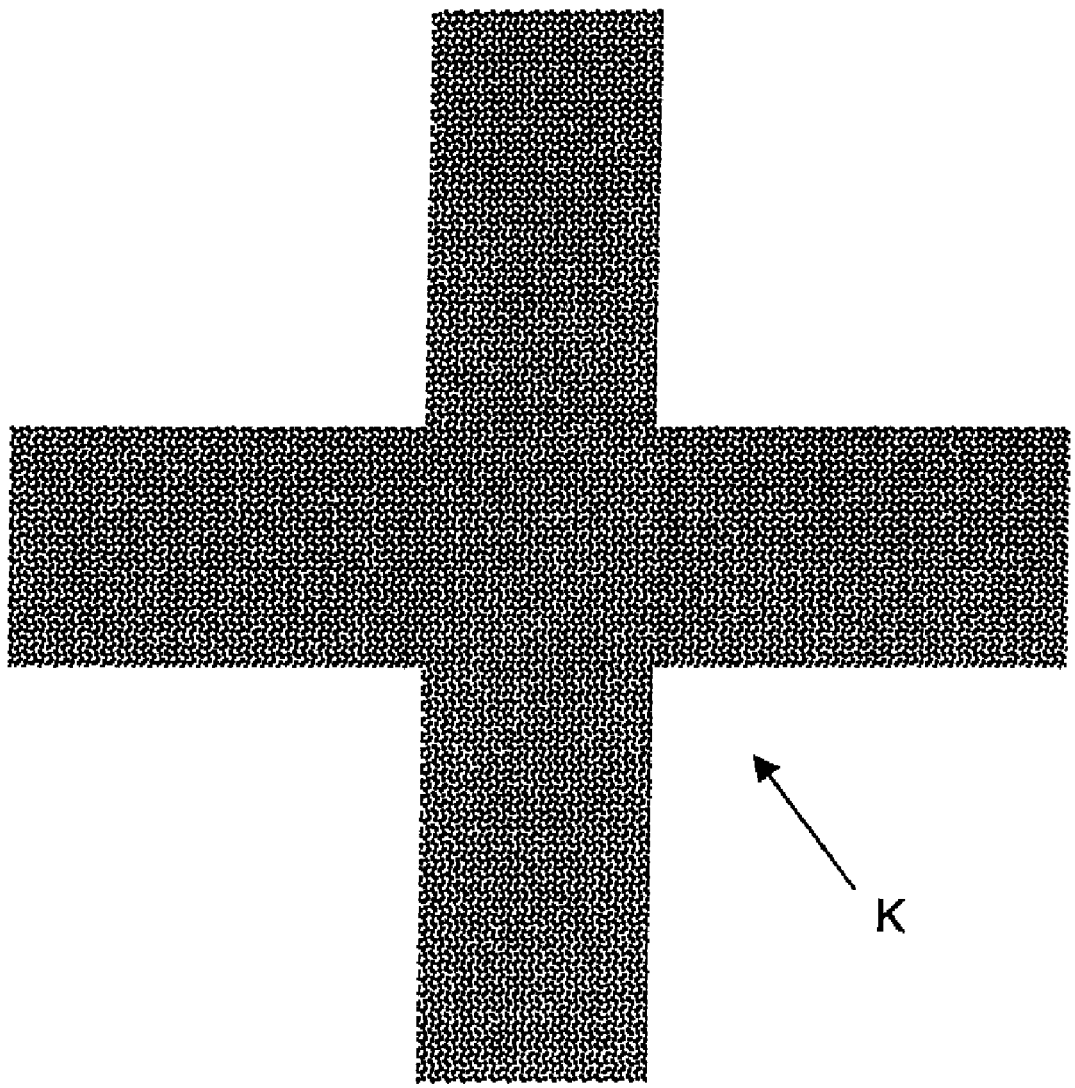
FIG. 4 shows a schematic cross section through a channel cross of a biscuit-fired ceramic with open porosity.

FIG. 4 schematically shows an intersecting point K of the honeycomb body channels 2 of a biscuit-fired honeycomb ceramic. This intersecting point, after the prefiring or the biscuit-firing, has open porosity.

Figure 5:
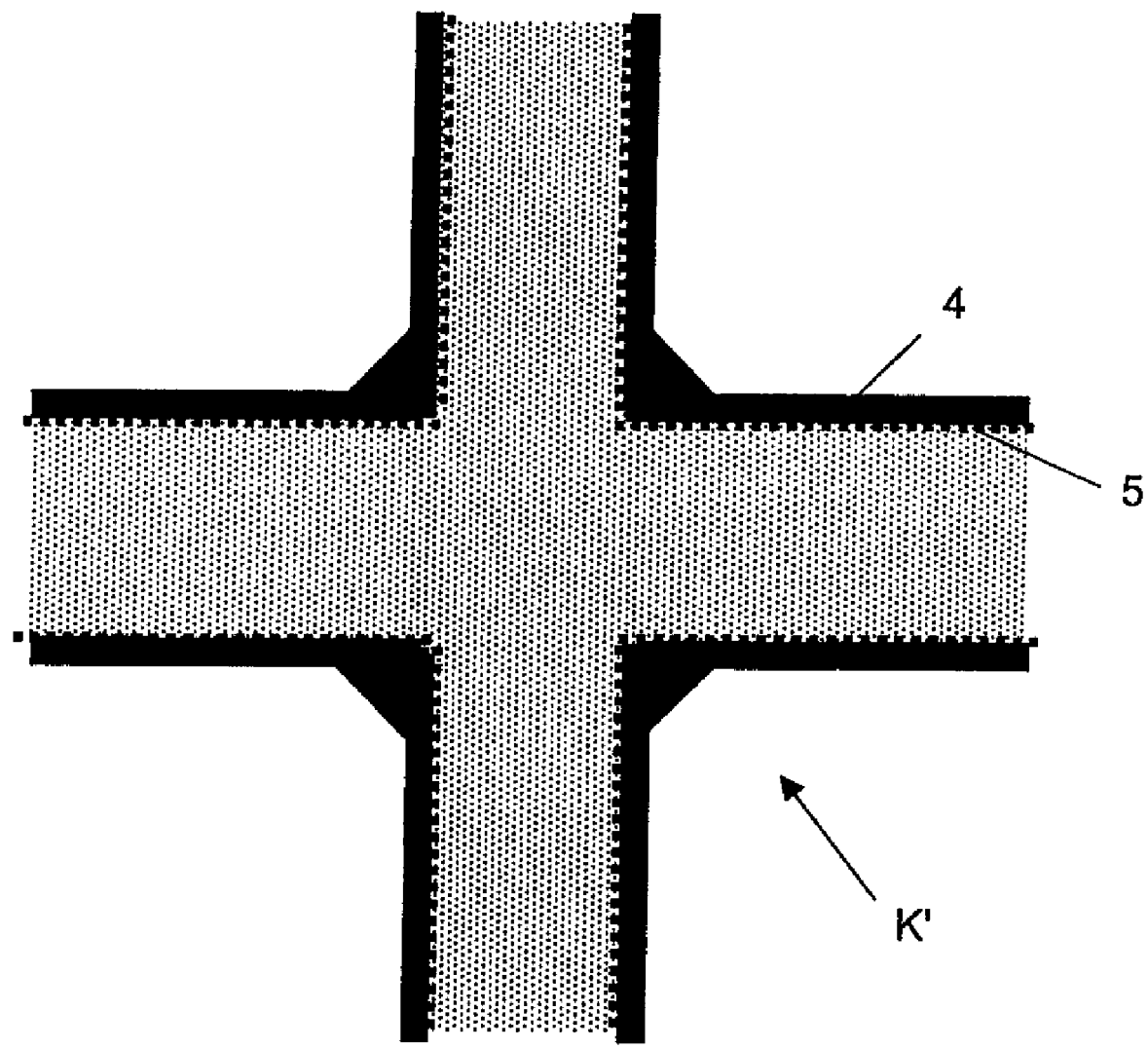
FIG. 5 shows a schematic cross section through a glazed honeycomb ceramic after firing.

FIG. 5 schematically shows an intersecting point K' of glazed channels 2 after the main firing. In the drawing, the anchoring of the glaze 4 in the surface pores 5 of the honeycomb ceramic 1 is visible.

The choice of the glaze material depends for one thing on the ceramic honeycomb or substrate material. For instance, similar coefficients of thermal expansion of the two materials are a prerequisite for the bond of the resultant composite material, because only then can the thermal loads be withstood.

The choice of the glaze material depends for another thing on the chemical attack to be expected in later use. For instance, special alkali-resistant glaze materials can minimize the diffusion of corrosive exhaust gas ingredients into the ceramic honeycomb body material and thus can increase the service life of the honeycomb bodies.

In general, glazing ceramic honeycomb bodies is an efficient and relatively inexpensive way of achieving a tailor-made combination of properties that is advantageous for the later field of use, properties that can be attained, if at all, only at considerable expense with unglazed ceramic materials.

Depending on the size of the honeycomb body, the coating of the honeycombs can be done with glaze material, in a manner known per se, in an immersion or flushing process; the outer skin of the honeycomb bodies must remain uncoated, to prevent it from sticking to the supporting surfaces during the firing process.

Figure 1:
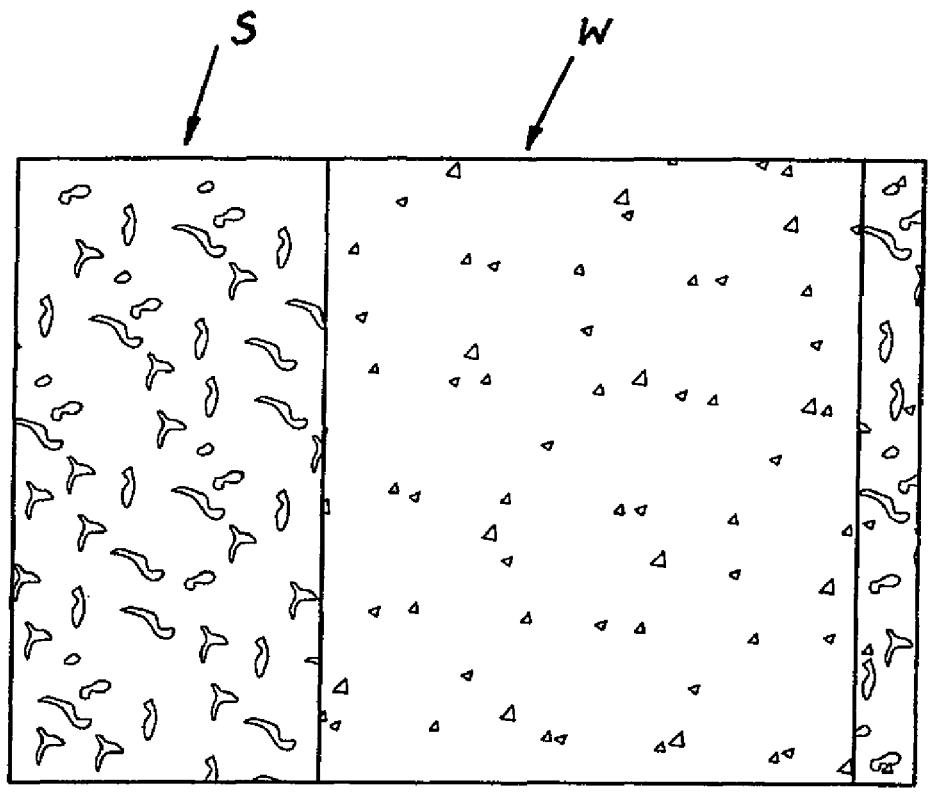
FIG. 1 shows a conventional silicon deposit S on a honeycomb body channel wall W.
Figure 2:
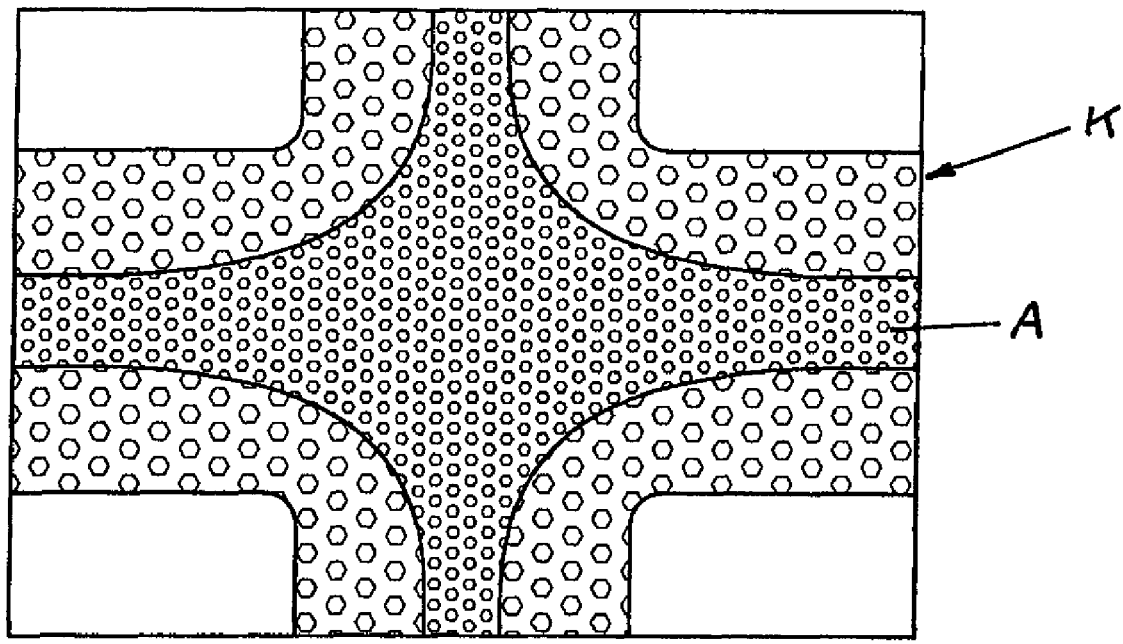
FIG. 2 is SEM/EDAX Na-mapping (SEM represents Scanning Electron Microscopy; EDAX represents Energy Dispersive Analysis of X-rays) that shows a cross-section through the intersection of ceramic walls from adjacent channels, in which inward diffusion of the alkaline exhaust gas ingredient A and the resultant corrosion of the ceramic can be seen.

The honeycomb bodies intended for coating with glaze slip are chemically pretreated, for the sake of better processability and manipulation, or are advantageously fired at a temperature, such as 900° C., that must be lower than the actual firing temperature of the ceramic material (biscuit firing). Biscuit-fired material has the advantage of still possessing a very high open porosity (see FIG. 1), which assures good wettability. Moreover, the pore system offers a good anchorage for the glaze layer to be applied, which causes strong adhesion of the glaze to the ceramic material. In addition, biscuit firing is economical, because of the low temperature.

For completely or adequately preventing the wetting of the outer skin of the honeycomb body with glaze, the side walls in the immersion process are masked or coated with a glaze-repellent coating. In the case of the through washing process, only the inner channel walls come into contact with glaze slip, and thus sealing of the outer walls can be dispensed with.

After the drying of the coated honeycomb bodies, at a temperature such as 60° C., the sharp firing takes place at the firing condition appropriate for the ceramic substrate material and the layer of glaze on it. The sharp firing is at a temperature such as 1300° C.

As an alternative to glazing biscuit-fired honeycombs, a nonaqueous glaze (alcohol or oil-based) with organic additives can be used, by which it becomes possible to glaze green honeycombs that have not been pretreated thermally. If the size of the honeycomb body or the channel geometry allow it, the layer of glaze can also be applied by means of spraying or by various powder-coating processes.

One embodiment of a glaze includes the following constituents.

| | |
|---|---|
| $SiO_2$ | 65% |
| $Al_2O_3$ | 11% |
| $Fe_2O_3$ | 1% |
| CaO | 6% |
| MgO | 2% |
| $Na_2O$ | 2% |
| $K_2O$ | 3% |
| $ZrO_2$ | 9% |
| $Cr_2O_3$ | 1% |

We claim:

1. A process for producing a honeycomb body from a noncatalytically active ceramic material for thermal regenerators, the process comprising the steps of:
   (a) providing a block-shaped monolithic honeycomb body created by extrusion, the honeycomb body having an interior formed with longitudinal channels;
   (b) applying a thermal pretreatment to the honeycomb body, whereby the honeycomb body includes surface pores;
   (c) after step (b), applying a glaze-repellent coating to outer walls of the honeycomb body, coating a glaze to all the longitudinal channels of the honeycomb body, and then drying the honeycomb body; and
   (d) after step (c), performing a firing operation to the glaze to anchor the glaze in the surface pores,
   wherein the glaze comprises 65% $SiO_2$, 11% $Al_2O_3$, 1% $Fe_2O_3$, 6% CaO, 2% MgO, 2% $Na_2O$, 3% $K_2O$, 9% $ZrO_2$, and 1% $Cr_2O_3$.

2. The process as claimed in claim 1, wherein the coating of the longitudinal channels is effected in an immersion or flushing process.

3. The process as claimed in claim 1, wherein the thermal pretreatment comprises a prefiring operation.

4. The process as claimed in claim 1, wherein the glaze is applied to by spraying or powder-coating.

5. The process as claimed in claim 1, wherein the step of applying a glaze-repellent coating to outer walls of the honeycomb body is carried out by coating.

6. The process as claimed in claim 1, wherein the step of applying a glaze-repellent coating to outer walls of the honeycomb body is carried out to form a mask of the glaze-repellent coating on the outer walls of the honeycomb body.

7. The process as claimed in claim 1, wherein the honeycomb body comprises alumina porcelain or cordierite ceramics.

8. The process as claimed in claim 3, wherein the longitudinal channels of the honeycomb body intersect with one another forming one or more intersecting points and wherein the open porosity is formed at the one or more intersecting points.

9. The process as claimed in claim 8, wherein the firing operation is performed to anchor the glaze in the surface pores at the one or more intersecting points.

10. The process as claimed in claim 1, wherein the outer walls of the honeycomb body are free of the glaze.

11. The process as claimed in claim 1, wherein the thermal pretreatment is carried out at a temperature lower than a temperature of the firing operation.

12. The process as claimed in claim 1, wherein the thermal pretreatment is carried out at a temperature of about 900° C.

13. The process as claimed in claim 1, wherein the firing operation is carried out at a temperature of about 1300° C.

14. The process as claimed in claim 1, wherein the drying step is carried out at a temperature of about 60° C.

15. A process for producing a honeycomb body from a noncatalytically active ceramic material for thermal regenerators, the process comprising the steps of:
(a) providing a block-shaped monolithic honeycomb body created by extrusion, the honeycomb body having an interior formed with longitudinal channels;
(b) applying a thermal pretreatment to the honeycomb body;
(c) after step (b), applying a glaze-repellent coating to outer walls of the honeycomb body, coating a glaze to all the longitudinal channels of the honeycomb body, and then drying the honeycomb body; and
(d) after step (c), performing a firing operation to the glaze;
wherein the glaze comprises 65% $SiO_2$, 11% $Al_2O_3$, 1% $Fe_2O_3$, 6% CaO, 2% MgO, 2% $Na_2O$, 3% $K_2O$, 9% $ZrO_2$, and 1% $Cr_2O_3$.

16. A process for producing a honeycomb body from a noncatalytically active ceramic material for thermal regenerators, the process comprising the steps of:
(a) providing a block-shaped monolithic honeycomb body created by extrusion, the honeycomb body having an interior formed with longitudinal channels, which intersect with one another forming one or more intersecting points;
(b) applying a thermal pretreatment to the honeycomb body, the thermal pretreatment comprising a prefiring operation, whereby the honeycomb body includes open porosity at the one or more intersecting points;
(c) after step (b), applying a glaze-repellent coating to outer walls of the honeycomb body, coating a glaze to all the longitudinal channels of the honeycomb body, and then drying the honeycomb body; and
(d) after step (c), performing a firing operation to the glaze to anchor the glaze in the open porosity in the honeycomb body,
wherein the glaze comprises 65% $SiO_2$, 11% $Al_2O_3$, 1% $Fe_2O_3$, 6% CaO, 2% MgO, 2% $Na_2O$, 3% $K_2O$, 9% $ZrO_2$, and 1% $Cr_2O_3$.

* * * * *